United States Patent
Zhang et al.

(10) Patent No.: US 11,083,951 B2
(45) Date of Patent: Aug. 10, 2021

(54) BALL SPIN RATE MEASUREMENT SYSTEM AND METHOD

(71) Applicants: Minmin Zhang, Franklin Park, PA (US); Jeremy Michael Rittenhouse, East Earl, PA (US); Michael J. Ressler, Pittsburgh, PA (US); William Walker Clark, Wexford, PA (US)

(72) Inventors: Minmin Zhang, Franklin Park, PA (US); Jeremy Michael Rittenhouse, East Earl, PA (US); Michael J. Ressler, Pittsburgh, PA (US); William Walker Clark, Wexford, PA (US)

(73) Assignee: Diamond Kinetics, Inc., Pittsburgh, PA (US)

( * ) Notice: Subject to any disclaimer, the term of this patent is extended or adjusted under 35 U.S.C. 154(b) by 0 days.

(21) Appl. No.: 16/437,289

(22) Filed: Jun. 11, 2019

(65) Prior Publication Data

US 2019/0374835 A1  Dec. 12, 2019

Related U.S. Application Data (60) Provisional application No. 62/683,116, filed on Jun. 11, 2018.

(51) Int. Cl.
| | | |
|---|---|---|
| *A63B 69/00* | (2006.01) | |
| *A63B 69/36* | (2006.01) | |
| *G01P 15/18* | (2013.01) | |
| *G01P 15/105* | (2006.01) | |
| *A63B 24/00* | (2006.01) | |

(52) U.S. Cl.
CPC ...... *A63B 69/3658* (2013.01); *A63B 24/0021* (2013.01); *G01P 15/105* (2013.01); *G01P 15/18* (2013.01); *A63B 2024/0034* (2013.01); *A63B 2220/35* (2013.01); *A63B 2220/40* (2013.01); *A63B 2220/833* (2013.01); *A63B 2225/52* (2013.01)

(58) Field of Classification Search
None
See application file for complete search history.

(56) References Cited

U.S. PATENT DOCUMENTS

| | | | | |
|---|---|---|---|---|
| 6,148,271 | A | * | 11/2000 | Marinelli ............... A63B 43/00 702/141 |
| 8,903,521 | B2 | | 12/2014 | Goree et al. |
| 8,905,855 | B2 | | 12/2014 | Fitzpatrick et al. |
| 9,032,794 | B2 | * | 5/2015 | Perkins ................. G01C 19/42 73/495 |
| 9,039,527 | B2 | | 5/2015 | Bentley et al. |
| 9,076,041 | B2 | | 7/2015 | Bentley et al. |
| 9,401,178 | B2 | | 7/2016 | Bentley et al. |
| 2008/0274844 | A1 | * | 11/2008 | Ward ..................... A63B 43/00 473/570 |
| 2009/0280921 | A1 | * | 11/2009 | Rankin ............. A63B 69/3676 473/199 |

(Continued)

*Primary Examiner* — Tramar Harper
(74) *Attorney, Agent, or Firm* — Dentons Cohen & Grigsby P.C.

(57) ABSTRACT

A system and method wherein ball spin rate and axis orientation are determined according to an electronic circuit that includes a magnetometer spin sensor module and, in the alternative, an electronic circuit that includes a spin sensor module with a plurality of accelerometers.

10 Claims, 8 Drawing Sheets

(56) References Cited

U.S. PATENT DOCUMENTS

| | | | |
|---|---|---|---|
| 2010/0184563 A1* | 7/2010 | Molyneux | A63B 24/0062 |
| | | | 482/1 |
| 2013/0073248 A1* | 3/2013 | Perkins | A63B 53/14 |
| | | | 702/141 |
| 2014/0277636 A1* | 9/2014 | Thurman | A63B 69/0002 |
| | | | 700/91 |
| 2014/0309058 A1* | 10/2014 | San Juan | G06F 19/3481 |
| | | | 473/422 |
| 2014/0349267 A1* | 11/2014 | Thornton | G09B 23/02 |
| | | | 434/276 |
| 2015/0105172 A1* | 4/2015 | Thurman | A63B 37/0056 |
| | | | 473/199 |
| 2015/0105173 A1* | 4/2015 | Thurman | G09B 19/0038 |
| | | | 473/199 |
| 2015/0182810 A1* | 7/2015 | Thurman | A63B 41/02 |
| | | | 473/570 |
| 2015/0328516 A1* | 11/2015 | Coza | A63B 24/0062 |
| | | | 473/446 |
| 2016/0354666 A1* | 12/2016 | Greenwait | G16H 20/30 |
| 2018/0154222 A1* | 6/2018 | Thurman | A63B 43/002 |
| 2018/0193696 A1* | 7/2018 | Gwydir | A63B 24/0062 |
| 2019/0099643 A1* | 4/2019 | Tsutsumi | A63B 69/00 |
| 2019/0175993 A1* | 6/2019 | Tattersfield | A63B 37/0083 |
| 2019/0258905 A1* | 8/2019 | Rankin | G01P 3/44 |
| 2019/0344144 A1* | 11/2019 | San Juan | A63B 71/0622 |

* cited by examiner

BALL SPIN RATE MEASUREMENT SYSTEM AND METHOD

RELATED APPLICATIONS

The present application claims the benefit under 35 U.S.C. § 119(e) of prior U.S. Provisional Application Ser. No. 62/683,116, filed Jun. 11, 2018, the entire contents of which are incorporated herein.

BACKGROUND OF THE INVENTION

Field of the Invention

The presently disclosed invention is directed to the methods for teaching athletic skills and, more particularly, teaching skills for athletics that involve movement of balls.

Discussion of the Prior Art

Measurement of ball flight in sports is an important outcome of player actions. For example, the arc and spin of a basketball is indicative of a player's shooting motion; the motion of a golf ball or tennis ball is indicative of the contact conditions between the ball and club (or racquet) as well as the motion of the club (racquet) head at contact; a football's spin and flight path are a result of the quarterback's arm and hand motions and grip on the ball; and a baseball pitch's movement is dependent on release speed, direction and spin, as imparted by the pitcher.

Figure 1:
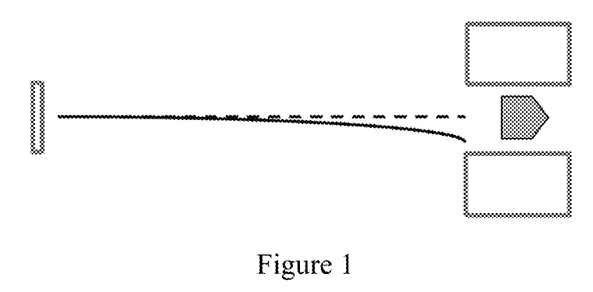
FIG. 1 illustrates an overhead view of a baseball trajectory.
Figure 2:
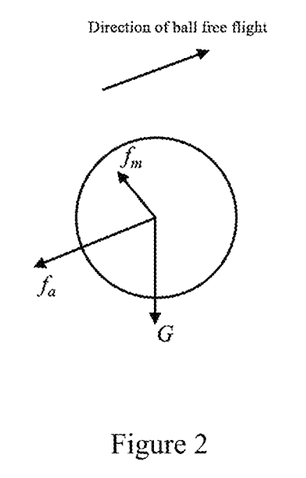
FIG. 2 illustrates forces on a ball in free flight.

For baseball and softball pitches in particular, the flight of the ball is particularly important. It is one of the key tools of a pitcher for misleading the batter and/or simply causing the batter to swing and miss the ball. A typical ball path is shown as the solid line in FIG. 1 from pitchers' mound (left) to home plate (right). Other than atmospheric conditions (e.g. wind, air temperature, density, and humidity), which are out of a pitcher's control, the path of a pitched ball is affected by release velocity (speed and direction in 3-dimensional space), release point (location in 3-dimensional space) and spin (rate and direction). During free flight, the ball is affected by three primary forces, as illustrated in FIG. 2, including gravity G, air resistance drag $f_a$, and the Magnus force $f_m$.

Gravity causes the ball to follow a curved path in the vertical direction according to Eq. 1:

$$z(t)=z_0+v_2(0)t-gt^2 \quad \text{(Eq. 1)}$$

where z is the vertical position of the ball in space, t is time elapsed from the moment of release, $z_0$ is the vertical position at release, $v_z$ is the vertical component of ball velocity at release, and g is the acceleration of gravity. The drag force is in the opposite direction of the ball's velocity and has the effect of reducing the ball's speed as it moves. The final force shown, and the one of most relevance to the presently disclosed invention, is the Magnus force.

The Magnus force is an aerodynamic force acting on the ball. It depends on the speed and direction of ball spin. If a ball is spinning while moving through the air, one side of the ball moves in the direction of the ball's flight so the rate of air flow over the ball surface is higher than rate of air flow over the opposite side of the ball, which moves opposite to the direction of flight. This differential in air speed gives rise to an unbalanced force on the ball that is called the Magnus force. The magnitude and direction of the Magnus force depends on a combination of spin rate and ball speed as expressed in Equation 2 (assuming atmospheric conditions are constant).

$$\vec{F}=(\pi^2 r^3 \rho)\vec{\omega} \times \vec{v} \quad \text{(Eq. 2)}$$

where r is the ball's radius, ρ is the density of air, and $\vec{\omega}$ and $\vec{v}$ are vector quantities of ball spin angular velocity and ball linear velocity in flight. Equation 2 shows that the magnitude of the Magnus force increases as the spin rate increases. Thus, as the pitcher imparts higher spin on the ball the Magnus force increases. Equation 2 also shows the direction of the Magnus force is determined by the cross product of the ball velocity vector and the spin axis vector. The direction of the Magnus force can cause a ball in flight to move in a direction different from the path that the ball would take if there were no aerodynamic forces. This is sometimes referred to as the "break" of the pitch.

By spinning a ball in a selected direction, the pitcher can cause the ball to break in any direction (up, down, or to either side horizontally) as it moves in 3 dimensional space toward home plate. For example, a "curve" ball has forward (top) spin which gives rise to a downward Magnus force and thus a downward break (more so than a ball thrown that falls only due to gravity); a fastball has backward spin, an upward Magnus force and therefore an upward break (actually pitchers cannot produce enough spin to cause the ball to rise, but it does not fall as fast as it would from the gravity force alone); and sliders and screwballs have horizontal break. In practice, for most pitches the Magnus force is not strictly vertical or horizontal, so the break is in both horizontal and vertical directions simultaneously.

In summary, both direction and magnitude of the ball's spin after release affect its flight path so that control of those values is important for a pitcher to perform effectively. In particular, it is generally desirable that a pitcher consistently control the direction of spin and maximize the spin rate applied to the ball. A facility for measuring these values can enable a pitcher to train and improve his or her skills.

In the prior art, pitch spin rate has been measured using fixed measurement systems that employ either radar or optical (for example, video, which can utilize the visual spectrum or beyond, such as infrared) analysis. One currently available commercial system called Rapsodo™ uses an optical method. That system measures pitch spin rate according to a fixed global reference frame and detects speed and direction of ball movement within that frame. Another currently available commercial tracking system (Trackman™) uses radar measurements at multiple locations to determine ball flight and spin information. Specifically for spin, the harmonics of modulated waves reflected from the ball's surface are used to determine spin rate. Spin axis can be deduced from the flight path as compared to a case with no spin (Tuxen, 2014) In video analysis systems, image analysis can be used to ascertain the orientation of ball threads and the change in orientation with respect to time to determine both spin axis and rate. While such systems can provide accurate measurements and estimates of ball spin conditions (as well as measuring velocities and/or positions of other objects), their fixed nature (the radar or cameras must be installed in fixed locations), cost, and complexity limit the use of such systems.

Inertial measurement systems have been developed to overcome certain disadvantages of fixed measurement systems such as radar and video capture systems. Inertial measurement systems typically include inertial measurement units (IMUs) that contain micro-electromechanical systems (MEMS) type inertial sensors such as triple-axis accelerometers (to measure acceleration), triple-axis angular rate gyros (to measure angular velocity), and triple-axis magnetometers (to measure orientation). Such systems have become popular in sports motion capture and measurement. For example, the SwingTracker™ system provided by Diamond Kinetics, Inc. integrates IMU-based sensors and is used to determine the path and speed of a baseball or softball bat to which it is attached.

The prior art includes methods and applications for using IMU-based sensors for motion of sports equipment and body segments of players (Perkins & McGinnis, 2011, 2012). A typical method used for measuring object motion with IMUs is to collect some combination of acceleration, angular velocity, and/or orientation data from the sensors and then to analyze the data to obtain position, velocity, and orientation of the body to which it is attached. By determining the IMU's (and thus the body's) orientation in space (from a combination of angular rate and orientation data) and then subtracting the acceleration of gravity from the acceleration measurements, accelerations can be integrated to obtain velocity and position of the body. The body's orientation and angular velocity can be obtained from the angular rate and orientation data.

To measure the motion of a pitched baseball, an IMU can be embedded directly into the ball, as taught in (Perkins & McGinnis, 2011, 2012). With that type of system, the conventional analysis previously described herein can be used to determine the ball's motion, including velocity, spin rate, and spin axis. As pitch speeds and spin rates become higher, however, the currently available sensors in the IMU (the angular rate gyros) are no longer capable of measuring the rotational speeds. For example, the rotational velocity (spin rate) of a pitched baseball can vary from 0 degrees per second (knuckle ball) to approximately 20,000 degrees per second (3,333 revolutions per minute, RPM) (e.g. curve ball). The high end of that range far exceeds capability of most MEMS angular rate gyros that are commercially available. Thus, the direct use of angular rate gyros to measure spin rate and axis orientation is insufficient. In addition, during the throwing motion the high angular rates of the ball cause the conventional methods of calculating orientation of the ball with respect to the global frame or field frame to be ineffective. Thus, even if the angular spin velocity vector in the ball frame is known, it cannot be known with respect to the global or field frames.

A gyro free system for measuring high rotational velocity involves the use of multiple accelerometers. It requires accelerometers located on faces of a cube. Prior art presents different configurations of accelerometers for obtaining the rotational velocity in 3D space, for instance 6 tri-axial accelerometers (Park, Tan, & Park, 2005) and 4 tri-axial accelerometers (Edwan, Knedlik, & Loffeld, 2012; Schopp, Klingbeil, Peters, & Manoli, 2010). However, such complexity of accelerometers increases the difficulty of hardware development and manufacture.

Accordingly, there was a need in the prior art for an improved system and method for determining spin rate and axis orientation of balls such as used in many types of athletic contests.

SUMMARY OF THE INVENTION

The presently disclosed invention is directed to a method for measuring ball spin information with a portable system. While the presently disclosed invention applies to any freely spinning object with the equipped sensors, of particular interest are sports balls and objects that experience free flight, such as baseballs, softballs, basketballs, footballs, soccer balls, cricket balls, tennis balls, and other moving balls and objects.

In accordance with the presently disclosed invention, a system for determining spin rate and spin axis orientation of a body in free flight includes an electronics circuit that is embedded in the body and a computer (including personal devices such as cell phones and tablets) that is capable of communicating with the embedded electronics circuit. The electronics circuit includes an inertial measurement unit and a spin sensor module. The spin sensor module generates data in accordance with the rotation of the body relative to a fixed reference frame. In some embodiments the inertial measurement unit and spin sensor module may be considered to be conceptual characterizations for describing the data processing because they may share physical sensing components or be a single set of components. The data from the spin sensor module is segmented according to data from the inertial measurement unit that equates to selected events and times of interest for the object, such as a starting location, ending location, pitch start, release time, catch time, etc.

Preferably, the electronics circuit of the presently disclosed invention includes one or more microcontrollers that mange and execute data acquisition, data computation, power management and communication processes that are associated with data that is generated by the inertial measurement unit and the spin sensor module. Also preferably, the electronics circuit includes a wireless communication module that is capable of sending data from said spin sensor module or data that is processed by said one or microcontrollers or both to a remote device.

In embodiments of the presently disclosed invention, the spin rate of the object can be determined by the electronics circuit and stored therein for later communication. In other embodiments, the spin rate of the object can be determined by a remote device that is in communication with the electronic circuit and that is capable of processing data that is generated by the inertial measurement unit and the spin sensor module. In still other embodiments, the spin rate of the object can be determined by the electronic circuit in combination with a remote device that is in communication with the electronic circuit and that is capable of processing data that is generated by the inertial measurement unit or by the spin sensor module or both.

Also preferably, the disclosed invention reconstructs the pitch motion according to data from the inertial measurement unit. More preferably, the disclosed system reconstructs the spin rate of the object from spin sensor data that is segmented according to data from the inertial measurement unit and reconstructs the spin axis of the object according to the reconstructed spin rate.

Other features, advantages and objects of the presently disclosed invention will become apparent to those skilled in the art as a description of several presently preferred embodiments proceeds.

BRIEF DESCRIPTION OF THE DRAWINGS

A presently preferred embodiment of the disclosed invention is shown and described in connection with the accompanying drawings wherein.

DESCRIPTION OF A PRESENTLY PREFERRED EMBODIMENT OF THE PRESENTLY DISCLOSED INVENTION

Figure 3A:
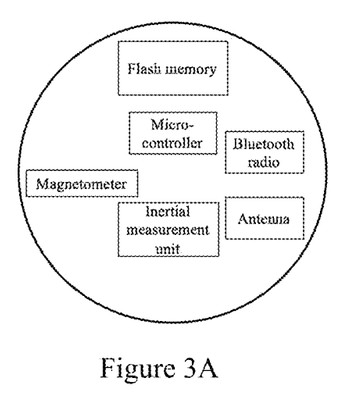
FIG. 3A is a first diagram for sensor electronics.

The presently disclosed invention includes a design of a small size electronics circuit that can be embedded in a baseball, softball, tennis ball etc. One embodiment of the electronics circuit includes a microcontroller, a communication module, a data storage module, an inertial measurement unit, a battery, and a spin sensor module. The microcontroller may be a single microcontroller or a combination of microcontroller(s) and digital signal processor(s) that together manage and execute all data acquisition, computational, power management, and communication processes associated with data collected concerning motion of the ball. The term "processor" refers to any and all such functional elements. The communication module can be Bluetooth or other wireless communication module that receives and sends data to and from a personal device such as computer or mobile phone. The data storage module can be a flash memory and/or a volatile memory. The inertial measurement unit may include any combination of accelerometers and/or gyroscopes and/or magnetometers (with one or more axes of measurement) that collect motion data during a pitch and may be in a common integrated circuit package or in separate packages. Additional accelerometer(s), angular rate gyro(s), and/or magnetometer(s) can be included as described below. In the disclosed invention, two different electronic circuit embodiments for measuring ball spin rate with different sensor modules are disclosed. One embodiment using a magnetometer, that can include one or more measurement axes, is shown in FIG. 3(a). Another embodiment using two accelerometers, each with one or more measurement axes, is shown in FIG. 3(b).

Figure 3B:
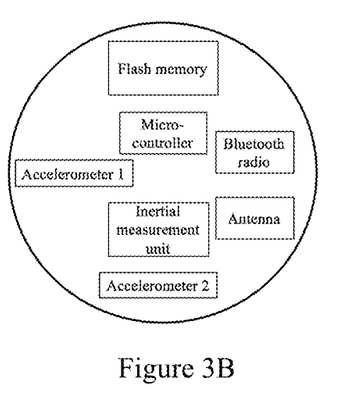
FIG. 3B is a second diagram for sensor electronics.
Figure 4:
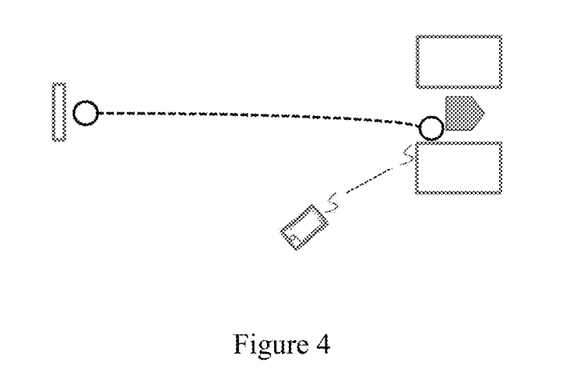
FIG. 4 illustrates the collection and recording of pitch data.

When a ball, equipped with at least one of the sensor configurations shown in FIG. 3A or FIG. 3B is pitched to home plate, both inertial measurement unit and spin sensor module record motion data during the pitch motion and free flight, as illustrated by the heavy dashed line in FIG. 4. When the pitch is completed, data from all sensor modules may be transferred to a personal device such as a mobile phone or tablet or a computer. The transferred data is then analyzed to determine spin rate.

Determination of spin rate in accordance with the presently disclosed invention may be accomplished with the use of a personal device or computer. At times when the personal device is not available or for purposes of limiting the quantity to data that is transferred to the personal device, determination of spin rate may be accomplished through use of the sensor electronics.

When using the sensor electronics to limit the quantity of data that is transferred to the personal device, some or all of the spin analysis may be executed on the embedded processor and the transferred information may include a processed result alone or both sensor data and the processed result, or portions of the processed result and portions of the sensor data. At times when a communications channel is available, the processed result and/or data and/or portions thereof can be transferred immediately. At times when no communications channel is available or when it is otherwise desirable to make such transfer at a later time, the processed result and/or the data and/or both may be stored in memory.

Figure 5:
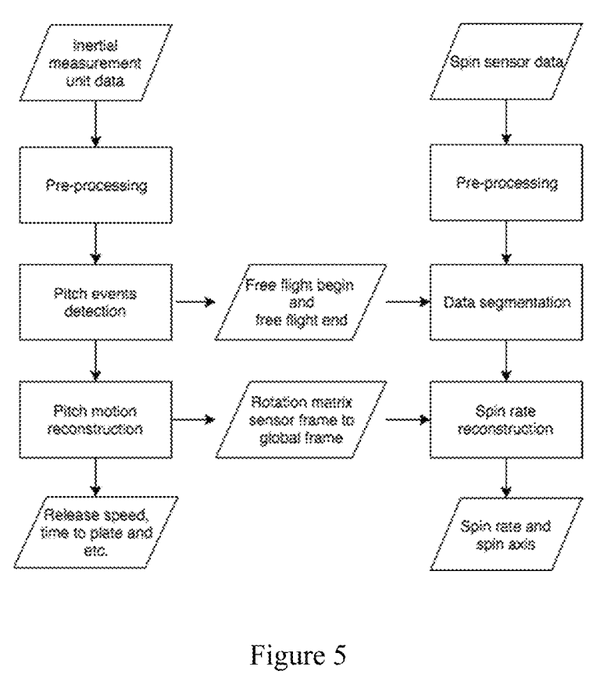
FIG. 5 shows a logic diagram for the disclosed system and process.

A process diagram for the overall workflow for the disclosed spin analysis system and method is shown in FIG. 5. FIG. 5 shows that data from inertial measurement unit 30 is pre-processed at step 32 and data from spin sensor 34 is pre-processed at step 36. Such preprocessing may be used to filter signal noise or to perform signal calibration prior to further processing.

At step 36, pre-processed data is analyzed according to a rule-based system that identifies key time instances of pitch motion in inertial measurement unit data. For example, the rule-based system may determine when the ball is held still in the player's hands by noting when that the gyroscope magnitude data is close to zero and acceleration magnitude data is close to gravity (each within certain tolerance).

At step 38, key time instances of beginning of free flight (release) and end of free flight (catch or impact) as determined in the pitch events detection calculations are used to segment spin sensor data, meaning that the ball is spinning freely in space during the intervening time period.

At step 40 the system reconstructs ball motion in 3-dimensional space according known methods for processing the inertial measurement unit data. A rotation matrix that relates the ball frame to the global frame is used for spin axis determination as is hereinafter more fully explained. Other pitch metrics, such as release speed and time to plate also are obtained in this step.

At step 42 spin rate is reconstructed. The method for spin rate reconstruction depends of the type of sensor module. Different methods correspond to different types of sensor modules as is hereinafter more fully explained.

With reference to the magnetometer sensor module that is shown in FIG. 3A, a magnetometer is used to detect the environmental magnetic field (that is, the earth's magnetic field) projected onto the sensor coordinate frame. Assuming that there are no abnormal magnetic disturbances, the environmental magnetic field maintains the same direction in three-dimensional space throughout the ball's flight. Because the ball with the embedded magnetometer is spinning during free flight, the magnetometer reading changes correspondingly throughout the flight due to the changing relative attitude between ball and magnetic field. For a system with a tri-axis magnetometer (three independent magnetometer sensors arranged along orthogonal axes) an illustration of the tri-axis data that is recorded by the magnetometer during the entire pitch motion is demonstrated in FIG. 6.

Figure 6:
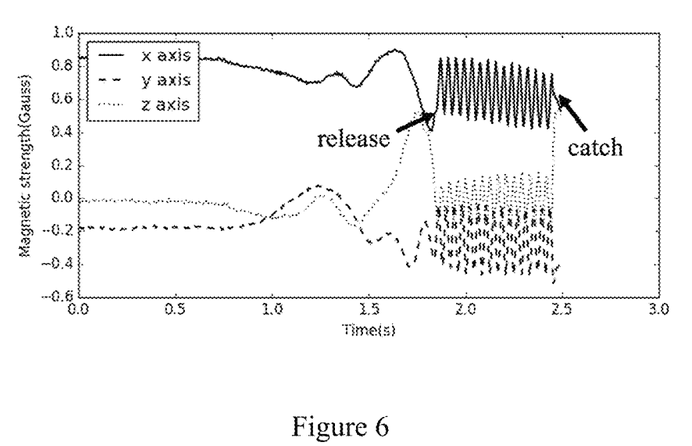
FIG. 6 illustrates the magnetic data in 3 axes during a pitch motion.

FIG. 6 shows that magnetic data is a periodic signal during free flight and that free flight occurs between the two key time points: (a) the release point; and (b) the catch or impact point (whether the ball is caught or impacts a net or ground or other object, the effect is essentially the same for the purposes of this invention, and the time of impact is denoted as the end of flight).

Figure 7:
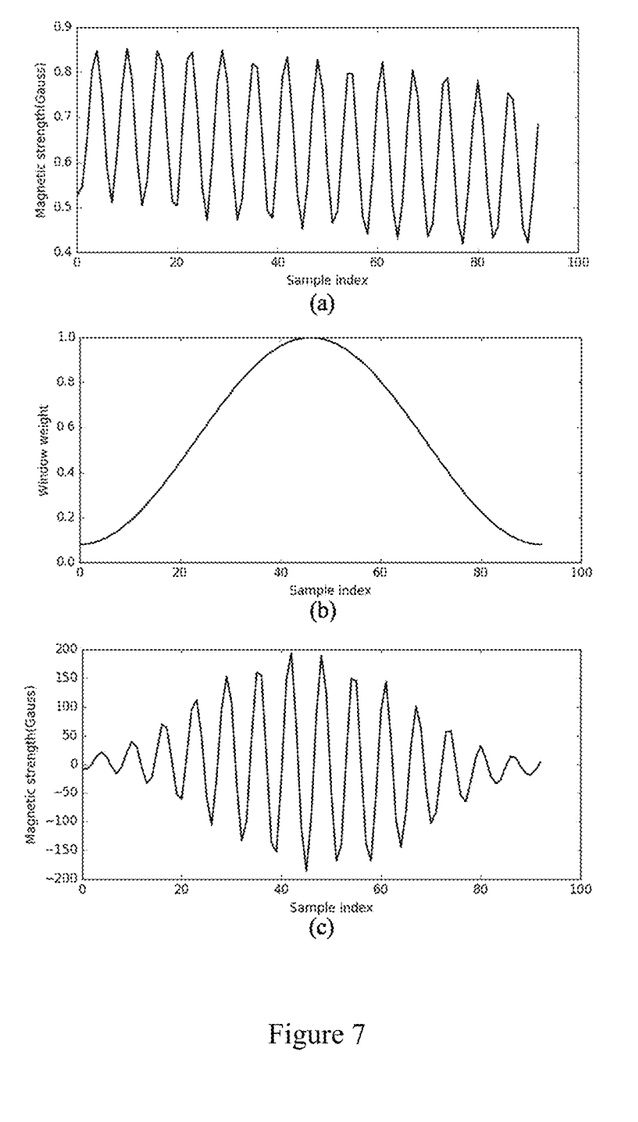
FIG. 7 is illustrates an example of applying a window function to magnetic data.

To determine spin rate, the system may first process the data such as, for example, in a Hamming window onto the magnetometer data that is truncated by the release point and the catch point. FIG. 7(a) shows an example of raw magnetometer data of one axis during the free flight period. FIG. 7(b) is a visualization of a Hamming window. FIG. 7(c) shows the results of this step. Before applying the Hamming window, the mean value is subtracted from the signal in FIG. 7(a) to remove the DC component in the frequency domain analysis of the next step.

The next step in determining spin rate applies the Discrete Fourier Transform (DFT) on each axis of the processed magnetometer data (e.g. the data in FIG. 7(c)) as follows:

$$X_k = \sum_{n=0}^{N-1} x_n e^{-i2\pi k n/N} \quad k=0,\ldots,N-1 \quad \text{(Eq. 3)}$$

where $x_n$ is the value of signal at index of n, N is the total number of data points in the truncated (free flight) window, and $X_k$ is the magnitude at the kth frequency bin. According to the linearity property of the DFT operation, the magnitude of the frequency domain value of each axis can be summed to get the overall frequency components of the spin motion.

Figure 8:
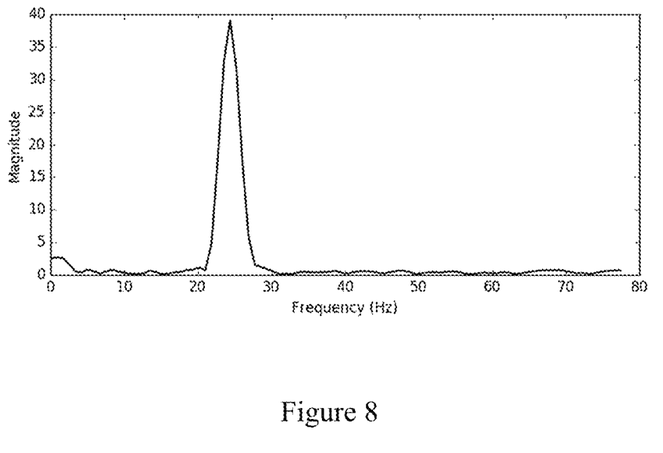
FIG. 8 shows the Discrete Fourier Transform representation of magnetometer data.

FIG. 8 shows an example frequency domain result after applying the analysis described above. In the example of FIG. 8, the peak value occurs at 24.4 Hz, which equates to a ball rotation of 24.4 revolution per second.

Figure 9:
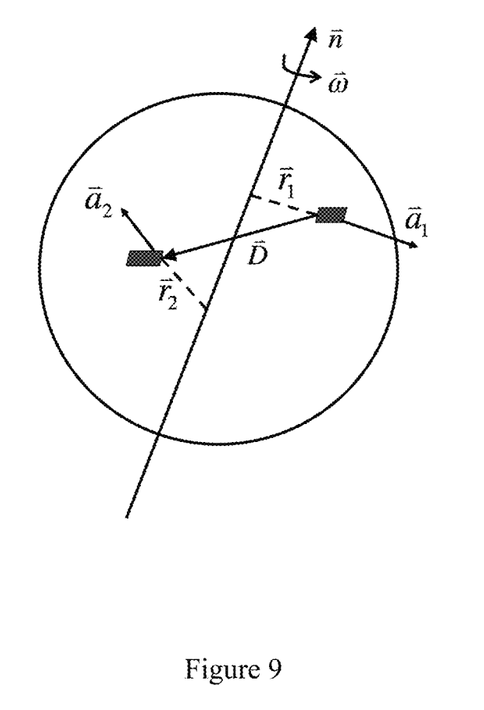
FIG. 9 illustrates a topology of two triple-axis accelerometers in a ball.

Signal processing in accordance with the accelerometer sensor module shown in FIG. 3B is further described in connection with FIGS. 9 and 10. As shown in FIG. 3B, two 3-axial accelerometers are located on a sensor board at some distance apart. The relative positions of the 3-axial accelerometers within the ball is not important. The relative position of accelerometer 1 to accelerometer 2 can be represented by vector $\vec{D}$. $\vec{D}$ is a known vector in the ball frame at the time that the ball with embedded sensors is manufactured. In a baseball or softball application, for example, the magnitude of $\vec{D}$ is limited as illustrated in FIG. 9.

While the ball is spinning in the air, the two accelerometers read instantaneous centripetal acceleration from different locations within the ball. The acceleration, $\vec{a}_1$ and $\vec{a}_2$, read from each sensor is dependent on the angular velocity of ball spin $\vec{r}$ (where $\vec{n}$ in FIG. 9 is a unit vector in the direction of the spin axis) and the relative distance vectors, $\vec{r}_1$ and $\vec{r}_2$, from sensor to spin axis, as shown in FIG. 9, according to Eq. 4.

$$\vec{a}_i = \vec{\omega}_i \times (\vec{\omega}_i \times \vec{r}_i) \quad \text{(Eq.4)}$$

The maximum allowed distance between the two accelerometers is determined by the size of the ball and the maximum range of accelerometers. For example, while using 200 g accelerometers to measure up to, for example, 3,333 RPM spin, the distance cannot be more than 44.0 mm (1.73 inch). Otherwise, the accelerometers may be saturated when the ball is rotating about certain axes. Aside from this limitation, the maximum distance cannot exceed the ball diameter or else at least one of the sensors would be outside of the ball. The minimum distance is determined by the required resolution for the accelerometer reading. For instance, according to Equation 4 to get at least 0.1 g difference between the two accelerometers while measuring spin of a ball rotating at 500 RPM, the minimum distance between the two accelerometer is 5.1 mm (0.2 inch).

The direction of centripetal acceleration is perpendicular to the rotation axis so the direction vector of spin axis $\vec{n}$ is determined by the acceleration vector $\vec{a}_1$ and $\vec{a}_2$ as in Equation 5:

$$\vec{n} = \frac{\vec{a}_1 \times \vec{a}_2}{|\vec{a}_1 \times \vec{a}_2|} \quad \text{(Eq. 5)}$$

where all variables are represented in the sensor coordinate frame.

Figure 10:
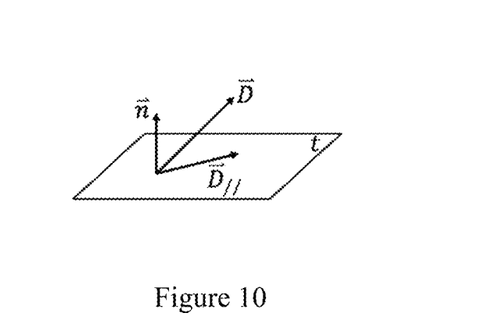
FIG. 10 represents a projection of sensor distance vector onto a plane.

To determine the values of $\vec{r}_1$ and $\vec{r}_2$, vector $\vec{D}$ is projected onto the plane t, which is perpendicular to the spin direction vector as shown in FIG. 10. The projection component is represented by $\vec{D}_{//}$ which is solved as in Eq. 6

$$\vec{D}_{//} = \vec{D} - (\vec{D} \cdot \vec{n})\vec{n} \quad \text{(Eq. 6)}$$

Figure 11:
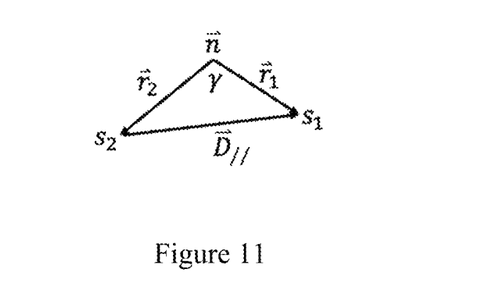
FIG. 11 illustrates the geometric relationship between distance vectors.

$\vec{D}_{//}$ is on plane t, while $\vec{r}_1$ and $\vec{r}_2$ are parallel to plane t, all of the three vectors can be placed on the same plane as shown in FIG. 11, where $\vec{n}$ collapses to be a point since it is perpendicular to plane t. From the law of cosines, the relationship between variables in FIG. 11 can be derived as in Eq. 7:

$$|\vec{D}_{//}|^2 = |\vec{r}_1|^2 + |\vec{r}_2|^2 - 2|\vec{r}_1||\vec{r}_2|\cos\gamma \quad \text{(Eq. 7)}$$

where $\gamma$ is the angle between vector $\vec{r}_1$ and $\vec{r}_2$.

A new variable $\alpha$ is introduced, which is the ratio between the magnitude of accelerometer reading vectors as in Eq. 8:

$$\alpha = \frac{|\vec{a}_1|}{|\vec{a}_2|} \quad \text{(Eq. 8)}$$

where, from Eq. 4 $\alpha$ can be shown to also be the ratio between magnitude of distance vector $\vec{r}_1$ and $\vec{r}_2$, i.e.

$$|\vec{r}_1| = \alpha |\vec{r}_2| \quad \text{(Eq. 9)}$$

Substituting Eq. 8 into Eq. 7, and re-organizing, results in the expression of Equation 10

$$|\vec{r}_2| = \frac{|\vec{D}_{//}|^2}{\alpha^2 + 1 - 2\alpha\cos\gamma} \quad \text{(Eq. 10)}$$

Replacing $\alpha$ by Equation 9 allows $|\vec{r}_2|$ to be expressed as shown in Equation 11:

$$|\vec{r}_2| = \frac{|\vec{D}_{//}| \cdot |\vec{a}_2|}{\left(|\vec{a}_1|^2 + |\vec{a}_2|^2 - 2\vec{a}_1\vec{a}_2\right)^{1/2}} \quad \text{(Eq. 11)}$$

The magnitude of spin velocity can be expressed as in Equation 12:

$$|\vec{\omega}| = \left(\frac{|\vec{a}_2|}{|\vec{r}_2|}\right)^{1/2} = \frac{\left(|\vec{a}_1|^2 + |\vec{a}_2|^2 - 2\vec{a}_1\vec{a}_2\right)^{1/4}}{|\vec{D}_{//}|^{1/2}} \quad \text{(Eq. 12)}$$

where $\vec{a}_1$ and $\vec{a}_2$ are directly read from the two 3-axis accelerometers while $\vec{D}_{//}$ is obtained by Equation 5 and Equation 6.

For both of the spin rate methods described above, the spin direction (the direction of $\vec{r}$ in Eq. 4) is known in the ball frame (sensor coordinate frame). As described above, it is also of interest to know the spin axis relative to the global frame or, more specifically, relative to the field frame. The global frame and field frames are both fixed axes on earth, but they may not be aligned with each other. The global frame may have some physical reference orientation (for example Z-axis is aligned opposite to gravity and X-axis is in the direction of magnetic north) whereas the field frame is aligned with the field or court of play (for example the Z-axis is aligned opposite to gravity and X-axis is in the direction from the pitcher to catcher on a baseball or softball field). In the case of a baseball or softball throw, one may wish to know the ball spin axis with respect to the field frame (as this relates to the break of the pitch). More specifically, one may choose to describe the spin axis with respect to the direction of ball flight (which nominally is along one of the field frame axes) or which may be determined by analysis of inertial measurement data according to established methods. The system and methods disclosed above allow determination of the ball spin rate, and the spin axis orientation is in the sensor coordinate frame (ball frame). A coordinate transformation is required to express the spin axis orientation in the field frame. The following subsections address determining this transformation.

From the spin sensor module data, the spin axis in the sensor coordinate frame, $\vec{n}^s$, can be obtained depending on type of sensor is in use. If the gyroscope is not saturated, the axis can be directly determined by gyroscope data.

Figure 12:
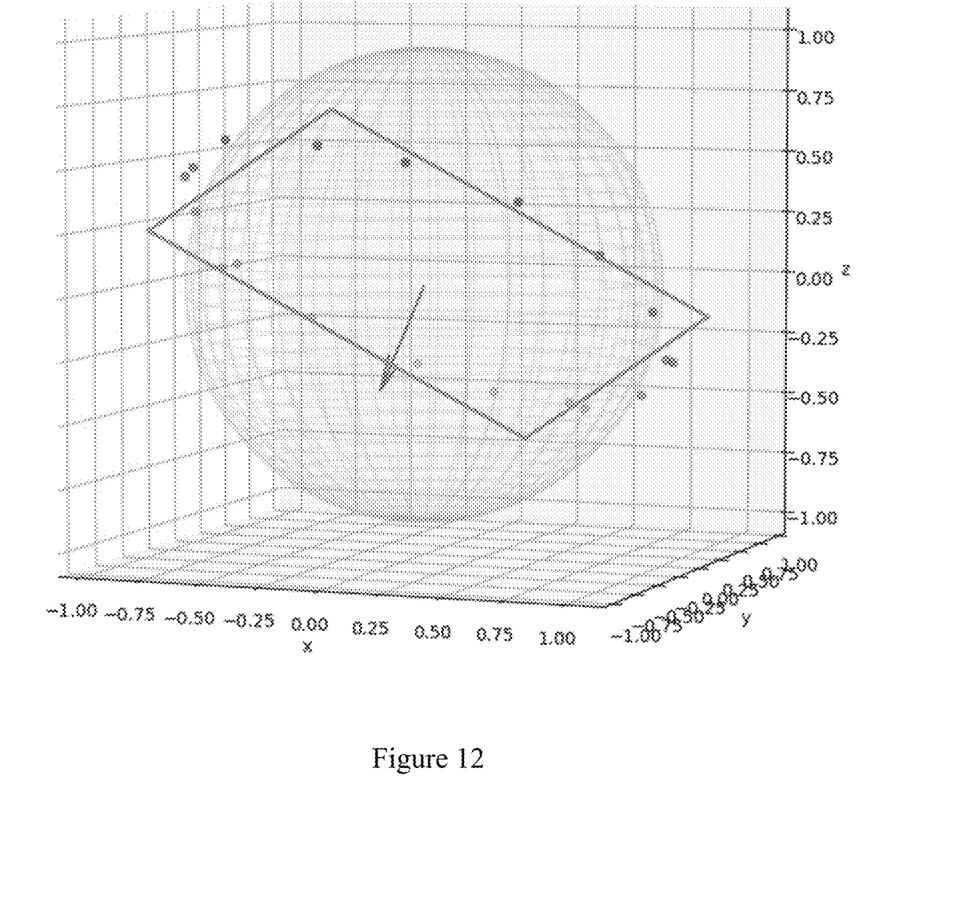
FIG. 12 represents magnetometer data sampled during free flight of the ball.

For the embodiment of the ball with embedded magnetometer sensor module, averaging the magnetometer vector data for a number of complete cycles provides the spin axis vector represented in the ball frame. For example, FIG. 12 shows a typical plot of magnetometer data that is sampled during free flight of the ball. Each point represents the 3-dimensional vector of measured magnetic field. The set of points lie approximately in a plane that is perpendicular to the spin axis of the ball. FIG. 12 shows a perpendicular vector to the plane, which represents the spin axis.

For the embodiment of the ball with embedded accelerometer sensor module, the ball frame spin axis vector can be calculated by Eq. 5. Each of these methods describes obtaining spin axis orientation in the ball frame, however, the information of interest is the spin axis in the field frame $\vec{n}^f$, which may be obtained by the following method.

Pitch motion reconstruction according to inertial measurement unit data, as shown in FIG. 5, also computes the rotation matrix that relates the ball frame and global frame at every sample instant. This rotation matrix can transform any vector quantity represented in the ball frame to the global frame. Because the ball spin axis is particularly of interest at the moment of release, the rotation matrix, $R_s^g$, at release point is computed for further analysis.

In order to describe the spin axis in the field frame, the directional correlation between the global frame and field frame needs to be resolved. Assume the release velocity vector has value as shown in Equation 12:

$$\vec{V}^g = [v_x^g v_y^g v_z^g]$$ [Eq.12]

and the horizontal direction from pitcher to home plate is the X-direction of the field frame, the heading angle between the global frame and field frame can be obtained by Equation 13:

$$\varphi = \tan^{-1}\frac{v_y^g}{v_x^g}$$ [Eq. 13]

The spin axis represented in the field frame is:

$$\vec{n}^f = R_g^f \cdot R_s^g \cdot \vec{n}^s$$ [Eq. 14]

where the rotation matrix $R_g^f$ is obtained by the heading angle φ as shown in Equation 15:

$$R_g^f = \begin{bmatrix} \cos\varphi & -\sin\varphi & 0 \\ \sin\varphi & \cos\varphi & 0 \\ 0 & 0 & 1 \end{bmatrix}$$ [Eq. 15]

Experimental Results

A high speed camera was used to validate the methods developed above. As an example, the accelerometer sensor module method is demonstrated. The camera was set up behind the pitcher facing towards the catcher. The camera height was set to roughly the same height of ball release height. The video was shot at 1200 fps. Using the video of a pitch, the number of frames of full revolution of the ball during free flight was counted to estimate the average ball spin rate during the first revolution.

Figure 13:
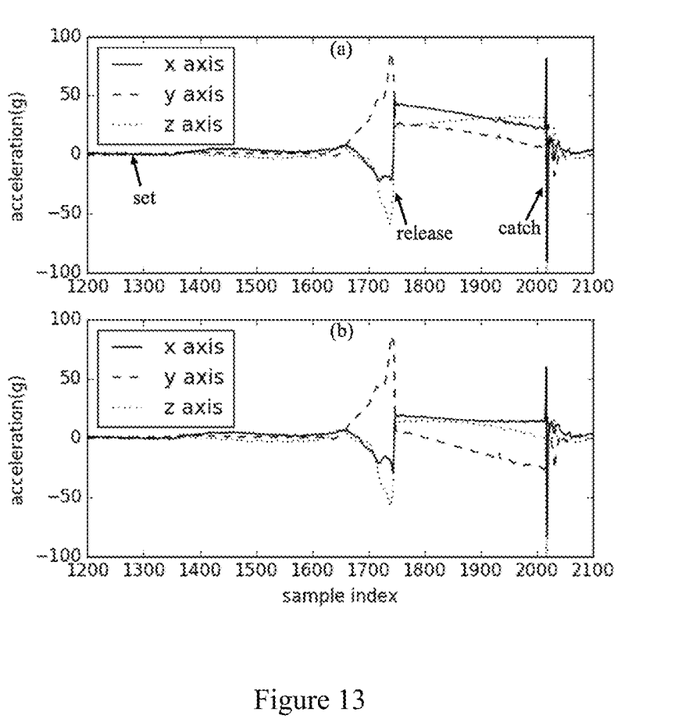
FIG. 13 illustrates data of an accelerometer pair during a pitch (top, accelerometer 1; bottom accelerometer 2)

In FIG. 13, the data output from the accelerometer pair during a complete pitch-catch motion is demonstrated. Three key time points found by motion detection procedure are also labelled: set, release and catch. Data between set and release records the ball motion in the pitcher's hand. Data between release and catch are free flight motion. It is clear that centripetal acceleration applied on the two accelerometers are different due to different location of the sensors in the ball.

Figure 14:
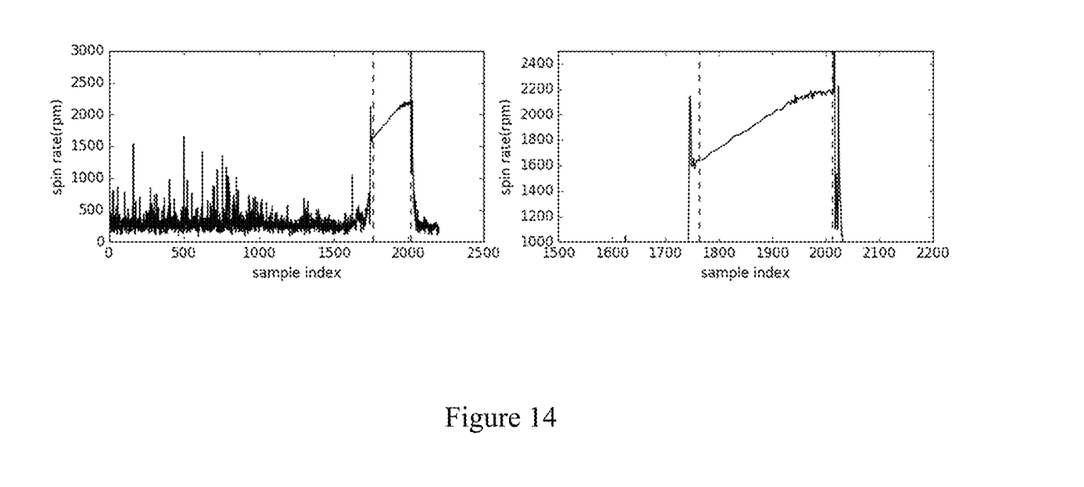
FIG. 14 shows spin rate results for an experimental sample pitch.

Applying the method explained above onto the raw data produces the results shown in FIG. 14). FIG. 14(a) demonstrates the calculated ball rotational speed during the entire pitch by the method developed in this work. The dashed lines indicates the moment of ball release (left) and ball catch (right). FIG. 14(b) is a detailed view of the free flight period. The spin rate estimated from the video is 1756-1800 rpm, the average of the first 50 samples from sensor data is 1720 rpm. Considering the resolution of spin rate measurement from video camera is about 40 rpm, the difference between the presently disclosed system and method and video camera was shown to be accurate to within the camera resolution.

We claim:

1. A system for determining a spin rate and spin axis orientation of a body in motion, said system comprising:
an electronics circuit that is located in said body, said electronics circuit determining a rotation matrix that relates a reference frame of said body to a global reference frame whereby data defining the reference frame of said body is transformed to global frame data that defines said global reference frame, said electronics circuit including;
an inertial measurement unit (IMU) that generates IMU data in accordance with the motion of said body relative to a starting location and an ending location;
a spin sensor module that generates spin sensor data in accordance with rotation of said body relative to a reference frame;
at least one microcontroller that manages and executes acquisition of the IMU data and the spin sensor data computations based on the IMU data and the spin sensor data, and power management and communication processes associated with the IMU data and the spin sensor data;
a data storage module for storing data from said spin sensor or said at least one microcontroller;
a wireless communication module that receives instruction data from a remote device and that sends said spin sensor data or data from said at least one microcontroller to a computing device;
a battery that supplies electrical power for said microcontroller and said wireless communication module; and
a processing device that communicates with said wireless communication module, said processing device processing data from said electronics circuit to display the spin rate of said body,
wherein said electronics circuit alone or said processing device alone or said electronics circuit in combination with said processing device determine the spin rate of said body, and
wherein the spin rate of said body is reconstructed from said spin sensor data that is segmented according to said IMU data and from said global frame data, and
wherein said electronics circuit determines selected events of the motion of said body according to said IMU data and wherein said spin sensor data is segmented according to said IMU data such that said system reconstructs a pitch motion according to said IMU data.

2. The system of claim 1 wherein said electronics circuit determines the spin rate of said body.

3. The system of claim 1 wherein said processing device determines the spin rate of said body.

4. The system of claim 1 wherein said system reconstructs the motion of said body in 3-dimensional space in accordance with said IMU data.

5. The system of claim 1 wherein said selected events correspond to a start position and a stop position.

6. The system of claim 1 wherein said spin sensor module includes more than one 3-axial accelerometer.

7. The system of claim 6 wherein data from first and second 3-axial accelerometers represents centripetal acceleration for different locations within said body.

8. The system of claim 1 wherein said spin sensor module includes a magnetometer with three independent magnetometer sensors arranged along orthogonal axes.

9. The system of claim 8 wherein each of said independent magnetometer sensors generates respective magnetometer data and wherein said respective magnetometer data is weighted.

10. The system of claim 9 wherein the weighted magnetometer data from each independent magnetometer sensor is processed to develop the overall frequency components of spin motion of said body.

* * * * *